Dec. 16, 1941. W. J. SPENGLER 2,266,283
COUPLING
Filed Dec. 21, 1939

INVENTOR
Walter J. Spengler
BY
F. Bascom Smith
ATTORNEY

Patented Dec. 16, 1941

2,266,283

UNITED STATES PATENT OFFICE 2,266,283

COUPLING

Walter J. Spengler, Sidney, N. Y., assignor to Bendix Aviation Corporation, South Bend, Ind., a corporation of Delaware Application December 21, 1939, Serial No. 310,375

9 Claims. (Cl. 287—53)

This invention relates to motion transmitting means and more particularly to means for adjustably coupling one angularly movable member, such as the rotor shaft of a magneto generator, to a similarly movable member, such as a driving part of an internal combustion engine.

One of the objects of the present invention is to provide novel means for coupling driving and driven rotatable elements to one another whereby the rotary motion of one may be transmitted to the other.

Another object of the invention is to provide a novel coupling for drivably connecting rotatable parts, which coupling is so constructed as to permit fine angular adjustments of one of said parts relative to the other.

Still another object is to provide a novel adjustable coupling for connecting a pair of rotating parts, the adjusting action of which may be determined by the feeling sense when the coupling is in a concealed position.

A further object is to provide novel coupling means which are simple and compact, yet sturdy and reliable, and which comprise only a small number of relatively rugged parts.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

In the drawing wherein like reference characters refer to like parts throughout the several views, Fig. 1 is a side elevation, partly in section and with parts broken away, illustrating one form of coupling embodying the present invention;

Figure 1:
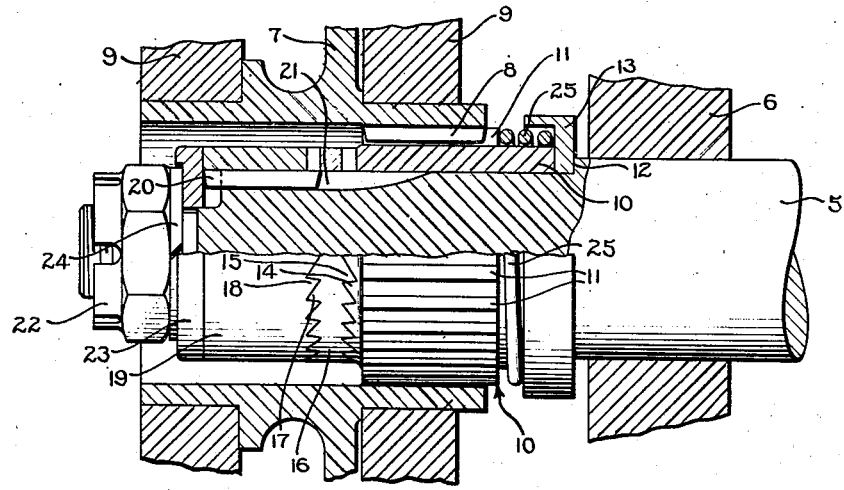

The embodiments of the invention illustrated in the drawing have been shown, by way of example, in forms adapted for use in drivably connecting the rotor shaft of a magneto generator to a driving part of an internal combustion engine. In the interest of clarity and for the purpose of making the advantages of the invention more readily understandable, the same will be hereinafter described as being incorporated in an assembly of the above nature. In Fig. 1, shaft 5, which is journaled in bearing 6, may be considered as the rotor shaft of a magneto, and rotatable member 7, which is provided with internal splines 8 and is journaled in bearing 9, may be considered as a rotatable part of an internal combustion engine. It is to be understood, of course, that the novel coupling comprehended by the invention may be employed in numerous environments other than the one referred to above.

In coupling magnetos to engines today the almost universal practice is to secure an externally splined sleeve onto the rotor shaft for rotation therewith and for engagement with splines 8 of member 7. With this type of connection the angular adjustment between the driving and driven elements, i. e., member 7 and shaft 5, is limited to the angular distance between the centers of adjacent splines 8. A much finer adjustment than this is nearly always necessary for the purpose of properly timing or coordinating the magneto with the engine. To obtain this finer adjustment it is common practice to mount the magneto stator on the engine casing for suitable angular adjustment about the rotor, i. e., relative to shaft 5. The large magnetos which are employed in modern high-powered multicylinder engines require a considerable amount of valuable space for adjustment in this manner. Accordingly, said space is in reality wasted once the magneto has been properly adjusted. It has also become desirable in some installations, particularly with radio shielding harnesses, to so combine the magneto with other parts that angular adjustment of the magneto casing or stator is no longer feasible or possible. The coupling of the present invention renders it possible to quickly and easily obtain a fine and accurate angular adjustment between the magneto shaft itself and the engine part to which it is drivably connected, thereby insuring proper timing and efficient engine operation.

The novel coupling in the form illustrated in Fig. 1 comprises a sleeve 10 that is freely mounted on shaft 5 for axial and angular movement relative thereto and is provided with external splines 11 which drivably engage splines 8 of engine part 7. Axial movement of sleeve 10 to the right, as viewed in the drawing, is limited by suitable stop means consisting of a shoulder 12 on shaft 5 which is engaged by a spring retaining collar 13. The outer or left end of sleeve 10 is provided around its entire periphery with a plurality of ratchet teeth 14 which are adapted to mesh with an equal number of ratchet teeth 15 on the inner face of a ring or sleeve 16 which is freely mounted on shaft 5.

The opposite or outer face of member 16 is likewise provided with a plurality of ratchet teeth 17, the number of such teeth differing in number, preferably by one, from the number of teeth 15 for a purpose to hereinafter appear. Teeth 17 are adapted to mesh with an equal number of ratchet teeth 18 on the inner face of a second sleeve 19 which is mounted on shaft 5 for axial movement relative thereto and for rotation therewith, such as by means of internal splines 20 in the sleeve that mesh with external splines 21 on the shaft. It will be noted that the two sets of intermeshing teeth are oppositely cut and hence face in opposite directions so that when shaft 5 is rotated in one direction there is a tendency for teeth 15 to ride up on and jump over teeth 14, whereas when the shaft is turned in the opposite direction the tendency is for teeth 18 to slip over teeth 17.

The coupling unit comprising parts 10, 16 and 19 is normally held against stop means 12, 13 with the pairs of teeth 14, 15 and 17, 18 in mesh, as illustrated in Fig. 1, by a nut 22 threaded onto the outer reduced end of shaft 5. Nut 22 preferably presses against sleeve 19 through the medium of a rigid washer 23 and a lock washer 24. The coupling unit thus normally constitutes, in effect, a direct driving connection between member 7 and shaft 5, the driving effort of member 7 being transmitted to the shaft, or vice versa, through splines 8, 11, sleeve 10, intermediate ring 16, sleeve 19 and splines 20, 21.

In order to facilitate the making of an adjustment in the relative angular positions of shaft 5 and sleeve 10 or member 7 and to render it possible to make such an adjustment when the coupling unit is in a concealed position, means are provided for urging the parts toward nut 22 to yieldingly hold the two sets of ratchet teeth in engagement when said nut is screwed toward the outer end of the shaft a sufficient amount to release the parts 10 and 16 for angular movement relative to shaft 5 and sleeve 19. Said means, in the form illustrated, is constituted by a coil spring 25 which surrounds shaft 5 and is interposed between retainer collar 13 and the inner ends of splines 11 on sleeve 10, said spring being under compression at all times.

When it is desired to make an adjustment, nut 22 is screwed to the left, as viewed in the drawing, an axial distance equal at least to the depth or axial extent of one set of ratchet teeth 14, 15 or 17, 18. With the parts 10, 16 and 19 thus released for limited axial movement on the shaft, teeth are yieldably held in mesh by spring 25 and the parts 10 and 16 are free also to move angularly relative to shaft 5. If the shaft is now turned in a counter-clockwise direction, as viewed from the right in the drawing, while sleeve 10 is held against rotary movement by reason of its connection with member 7, teeth 18 will exert a cam action on teeth 17, thus moving members 10 and 16 axially to the right against the pressure of spring 25 until the crowns of engaging teeth 17 and 18 pass each other. As the latter occurs, members 10 and 16 are snapped back to the left by the spring and each tooth 17 will engage the next succeeding tooth 18. This snap action that occurs each time sleeve 19 advances one tooth relative to members 10 and 16, which remain in mesh, may be felt in shaft 5 and the accompanying click can also be heard to thereby facilitate adjustment when the coupling is concealed in the engine casing.

If shaft 5 is turned in the opposite or clockwise direction, as viewed from the right, ring 16 will remain in mesh with sleeve 19 and thus be carried along with the shaft. The coaction of teeth 15 with teeth 14 will, on the other hand, cause sleeve 10 to move axially to the right against the pressure of spring 25 until the crowns of teeth 15 pass the crowns of teeth 14. When this occurs and sleeve 10 is snapped back into meshing position by the spring the same click and feel, referred to above, inform the operative, when he cannot see the unit, that shaft 5 has been moved a distance equal to the pitch of one tooth relative to sleeve 10 and hence member 7 in a direction opposite to the relative movement which occurred between these parts when the shaft was moved in a counter-clockwise direction.

It will accordingly be seen that shaft 5 may be turned in either direction until the same is within the angular extent or pitch of one ratchet tooth to being in the desired position relative to member 7. The shaft is then oscillated—one tooth in a clockwise direction and one tooth in a counter-clockwise direction constituting one cycle of oscillation. The shaft is alternately moved in one direction relative to member 6 an amount equal to the pitch of teeth 14, 15 and in the other direction an amount equal to the pitch of teeth 17, 18. Since these two sets of teeth differ slightly in pitch it will be seen that shaft 5 and member 7 or sleeve 10 will move relative to each other during each cycle of oscillation an amount equal to this difference in pitch between the two sets of teeth. Oscillation of the shaft is continued until the parts are in the desired relationship and nut 22 is again screwed back into clamping position.

The difference in pitch above referred to may be determined by the particular numbers of teeth employed on the coupling members. In one embodiment now in use a shaft 5 having a diameter of approximately $^{65}/_{100}$ inch is employed and the maximum diameter of sleeve 10 is less than an inch. One face of ring 16 is provided with 23 teeth of equal pitch and the other face is provided with 24 teeth. A minimum angular adjustment of less than $2/3$ of a degree is accordingly possible with said unit. It will be understood, of course, that an even finer adjustment could be obtained by increasing the number of ratchet teeth and hence reducing the difference in the pitch of the two sets of teeth.

The provision of spring 25 is an important feature of the present invention in that it renders it possible to "feel" the action of a concealed coupling while an adjustment is being made therewith. Were it not for this feature in a magneto coupling, for example, it would be necessary to repeatedly remove the magneto from the engine, make a slight adjustment each time, tighten the coupling unit in position, and replace the magneto to determine the sufficiency of the adjustment. It would be necessary to repeat this a number of times until the proper relationship was found. If spring 25 is omitted the yielding pressure during adjustment may be applied manually by pressing lightly against sleeve 19. The latter is then oscillated the required amount while holding sleeve 10 against rotation to make the desired adjustment. In addition to providing the "feel," referred to above, spring 25 also performs the important function of normally holding the ratchet teeth in mesh when nut 22 is loosened. Accordingly, the magneto may be placed in position on the engine with nut 22 in releasing position. The desired adjustment can then be quickly and readily completed while the magneto is in position on the engine. Thereafter the magneto is removed from the engine and nut 22 is tightened, thereby placing the magneto in condition for permanent installation and operation.

Figure 2:
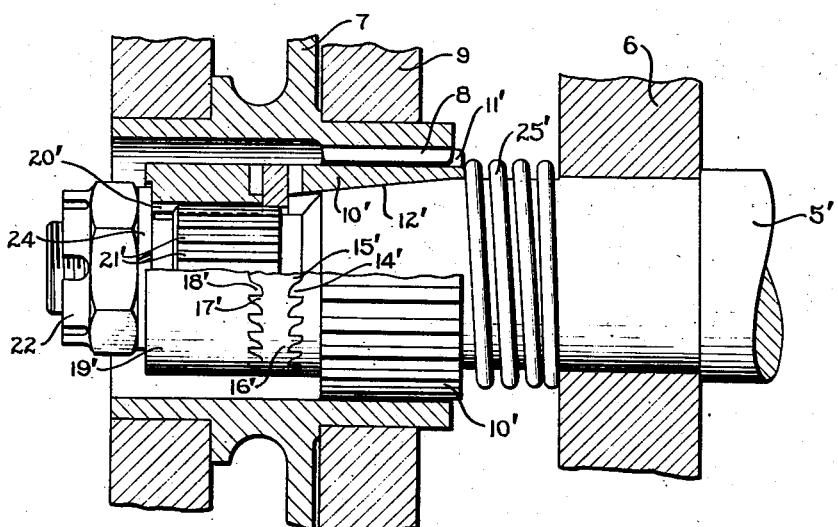
Fig. 2 is a similar view of a modified form of said coupling.
Figure 3:
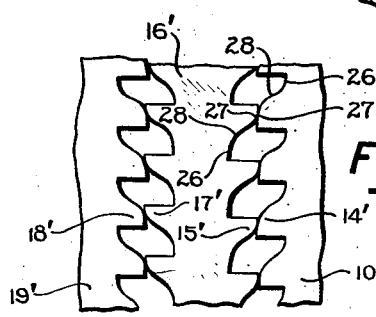
Fig. 3 is a partial development illustrating the type of ratchet teeth employed in the modification of Fig. 2, said teeth being shown out of mesh.

In order to further facilitate the making of a desired adjustment with a concealed coupling unit, the ratchet teeth may be novelly shaped to give the operative further information through the feeling sense relative to the positions and action of the parts of the unit. One novel form of ratchet teeth adapted for this purpose is shown in Figs. 2 and 3 wherein parts designated by primed numerals are slightly different from but correspond to the parts designated by the same numerals in Fig. 1. In the form shown, the tapered or cam portions of each tooth (14', 15', 17' and 18') comprises two relatively flat portions 26 and 27 and a relatively steep intermediate portion 28 (Fig. 3). Thus, when cooperating teeth first begin to move out of mesh with one another during the process of making an adjustment in the manner referred to above, surfaces 28 of adjacent teeth will be in engagement and render the initial movement thereof relatively difficult, said surfaces being nearly parallel to the direction of the force applied by spring 25'. As the teeth ride up on one another, as illustrated at either side of Fig. 3, the relatively flat surfaces 27, which are nearly perpendicular to said force, move into engagement so that less effort is required to actuate the relatively moving parts. Thus, at the points where rotation of the shaft requires the greatest effort, and these points are very well defined, the operative is informed that the ratchet teeth are in complete mesh. There is sufficient difference in the inclinations of the portions 27 and 28 of the teeth so that the increased compression of spring 25', when portions 27 are in engagement, will not disturb the desired result. It will also be seen that by reason of the sharply inclined portions 28 a lighter spring than is necessary in Fig. 1 may be employed for insuring complete meshing of the teeth under influence of the spring.

In addition to the shape of teeth 14', 15', 17' and 18' the modification shown in Fig. 2 differs structurally in some respects from the device shown in Fig. 1. These differences consist primarily in the omission of parts 13 and 23 and in the provision of a tapered portion 12' on shaft 5' which constitutes the stop means for limiting the axial movement of the coupling unit toward the right. It may be noted that when sleeve 10' is pressed tightly against tapered portion 12' there will be a gripping action between said sleeve and shaft 5' resulting in a substantially direct driving connection between element 7 and the shaft. The pairs of teeth 14', 15' and 17', 18' are accordingly relieved of at least a portion of the load.

There is thus provided a novel coupling unit which is simple both in construction and operation whereby small adjustments may be made in the relative angular position of two members drivably connected by the coupling. The unit provided comprises only a small number of parts which may be of small size and assembled into a very small space. Additionally, the coupling provided is so constructed that the action thereof may be detected by sound and feel when the same is in a concealed position. The parts of the coupling may be readily manufactured at relatively low cost and may be adapted for replacement of non-adjustable coupling means in existing installations.

Although only two embodiments of the invention have been illustrated and described in detail, it is to be expressly understood that the same is not limited thereto. The various parts may, for example, vary in size and design and the manner in which the various parts are drivably connected together may vary without departing from the spirit and scope of the invention as the same will now be understood by those skilled in the art. For a definition of the limits of the inventions reference is had primarily to the appended claims.

What is claimed is:

1. Apparatus of the class described having operative engagement with rotatable means and comprising a rotatable shaft, a power transmitting unit mounted on said shaft including a sleeve drivably engaging said rotatable means and adapted for movement axially and angularly relative to said shaft, a sleeve adapted for movement axially relative to said shaft and connected to the latter for rotation therewith, said sleeves having ratchet teeth on the adjacent ends thereof, the number of teeth on one of said sleeves being greater than the number of teeth on the other of said sleeves, and a ring loosely mounted on said shaft between said sleeves having ratchet teeth on both ends thereof adapted to mesh tooth for tooth with the teeth on said sleeves, stop means for limiting the axial movement of said unit in one direction on said shaft, means for releasably holding said unit against said stop means with the teeth on the adjacent ends of said sleeves and ring in driving mesh, and resilient means for yieldingly holding said teeth in mesh upon release of said unit by said holding means.

2. In apparatus of the class described, a rotatable shaft, a sleeve slidably mounted thereon, stop means engageable by said sleeve for limiting the axial movement thereof in one direction along the shaft, a sleeve mounted on said shaft and directly connected thereto for rotation therewith, a sleeve loosely mounted on said shaft intermediate said two first-named sleeves and having unequal numbers of ratchet teeth on opposed ends thereof, each tooth having one face substantially longer than the other face thereof and the teeth on both ends of said third-named sleeve having the longer faces thereof facing in the same circumferential direction and said two first-named sleeves having ratchet teeth on the adjacent ends thereof adapted to mesh with the teeth on said third-named sleeve, and means for releasably holding said sleeves in engagement and against movement axially of the shaft with the cooperating teeth thereof in engagement.

3. In apparatus of the class described, a rotatable shaft, motion transmitting means on said shaft comprising a member freely mounted on the shaft, a member connected to the shaft for rotation therewith and an element interposed between said members and having toothed engagement therewith, the cooperating teeth on said members and element being ratchet teeth, means for releasably holding said members in driving engagement with said element, and resilient means for yieldably holding said members in engagement with said element when the same are released by said holding means for movement axially of the shaft.

4. In apparatus of the class described, a rotatable shaft, a pair of sleeves slidably mounted on said shaft, means for connecting one of said sleeves to the shaft for rotation therewith, an element freely surrounding said shaft intermediate said sleeves, said element having ratchet teeth on opposite ends thereof adapted to mesh with ratchet teeth on the adjacent ends of said sleeves, said ratchet teeth being so cut that when said sleeves and element are free for axial movement relative to the shaft a driving engagement is effected between one of said sleeves and said element only during rotation of the shaft in one direction and between the other of said sleeves and said element only during rotation of the shaft in the other direction, and means for yieldably holding said sleeves in engagement with said element.

5. In apparatus of the class described, rotatable means comprising a shaft, said means having ratchet teeth thereon, a sleeve freely mounted on said shaft and having ratchet teeth on one end thereof adapted to engage said first-named ratchet teeth, a sleeve freely mounted on said shaft and having ratchet teeth adapted to mesh with ratchet teeth on the other end of said first-named sleeve, and means for yieldably holding said engaging teeth in mesh, the teeth on one end of said first-named sleeve being cut to provide a one-way driving connection in one direction of rotation and the teeth on the other end thereof being cut to provide a one-way driving connection in the other direction of rotation.

6. Apparatus of the class described comprising a rotatable member, a first element connected to said member for rotation therewith and axial movement relative thereto, an annular series of ratchet teeth on said first element, a second element mounted for rotary and axial movement relative to said first element and member, an annular series of ratchet teeth on said second element, the number of teeth in one of said series being less than the number of teeth in the other of said series, a ring mounted between said elements for rotary and axial movement relative to said elements and having ratchet teeth on opposite ends thereof adapted to engage tooth for tooth with the teeth on said elements, each of said ratchet teeth having one face thereof substantially longer than the other face thereof and the teeth on both ends of said ring having the longer faces thereof facing in the same circumferential direction, and means for releasably holding said member, elements and ring in assembled position with said ratchet teeth in driving mesh.

7. In apparatus of the class described, a rotatable member, a first element connected to said member for rotation therewith and axial movement relative thereto, a second element mounted for rotary and axial movement relative to said first element, each of said elements having ratchet teeth thereon, a ring interposed between said elements for rotary and axial movement relative thereto and having unequal numbers of ratchet teeth on opposite faces thereof adapted to mesh tooth for tooth with the teeth on said elements, said ratchet teeth being effective when yieldingly held in mesh to substantially lock said first element and ring together for rotation in one direction relative to said second element and to substantially lock said second element and ring together during rotation of said first element in the other direction relative to said second element, and means for releasably holding said member, elements and ring in assembled position with said ratchet teeth in driving mesh.

8. Apparatus of the class described comprising a rotatable member, a first element connected to said member for rotation therewith and axial movement relative thereto, an annular series of ratchet teeth on said first element, a second element mounted for rotary and axial movement relative to said first element and member, an annular series of ratchet teeth on said second element, the number of teeth in one of said series being less than the number of teeth in the other of said series, a ring mounted between said elements for rotary and axial movement relative to said elements and having ratchet teeth on opposite ends thereof adapted to engage tooth for tooth with the teeth on said elements, means for releasably holding said member, elements and ring in assembled position with said ratchet teeth in driving mesh, and resilient means for yieldingly holding said teeth in mesh upon release of said holding means, said teeth being so cut that when said holding means is released and said teeth are only yieldingly held in mesh by said resilient means said ring will rotate with said first element during rotation of the latter in one direction relative to said second element and be held against rotation by the ratchet teeth on said second element during rotation of said first element in the other direction relative to said second element.

9. A motion transmitting unit comprising a rotatable driving element, a rotatable driven element mounted for rotary and axial movement relative to said driving element, each of said elements having an annular series of ratchet teeth thereon, the number of teeth in one of said series being less than the number of teeth in the other of said series, and a member interposed between said elements and adapted for rotary and axial movement relative to said elements, said member having ratchet teeth on opposite faces thereof adapted to mesh tooth for tooth with the ratchet teeth on said elements, each of said ratchet teeth having one face thereof longer than the other face thereof and the teeth on both ends of said member having the longer faces thereof facing in the same circumferential direction.

WALTER J. SPENGLER.